March 6, 1945.     G. SMITH     2,370,883
APPARATUS FOR HEATING MATERIALS FOR MOLDING
Filed July 29, 1942
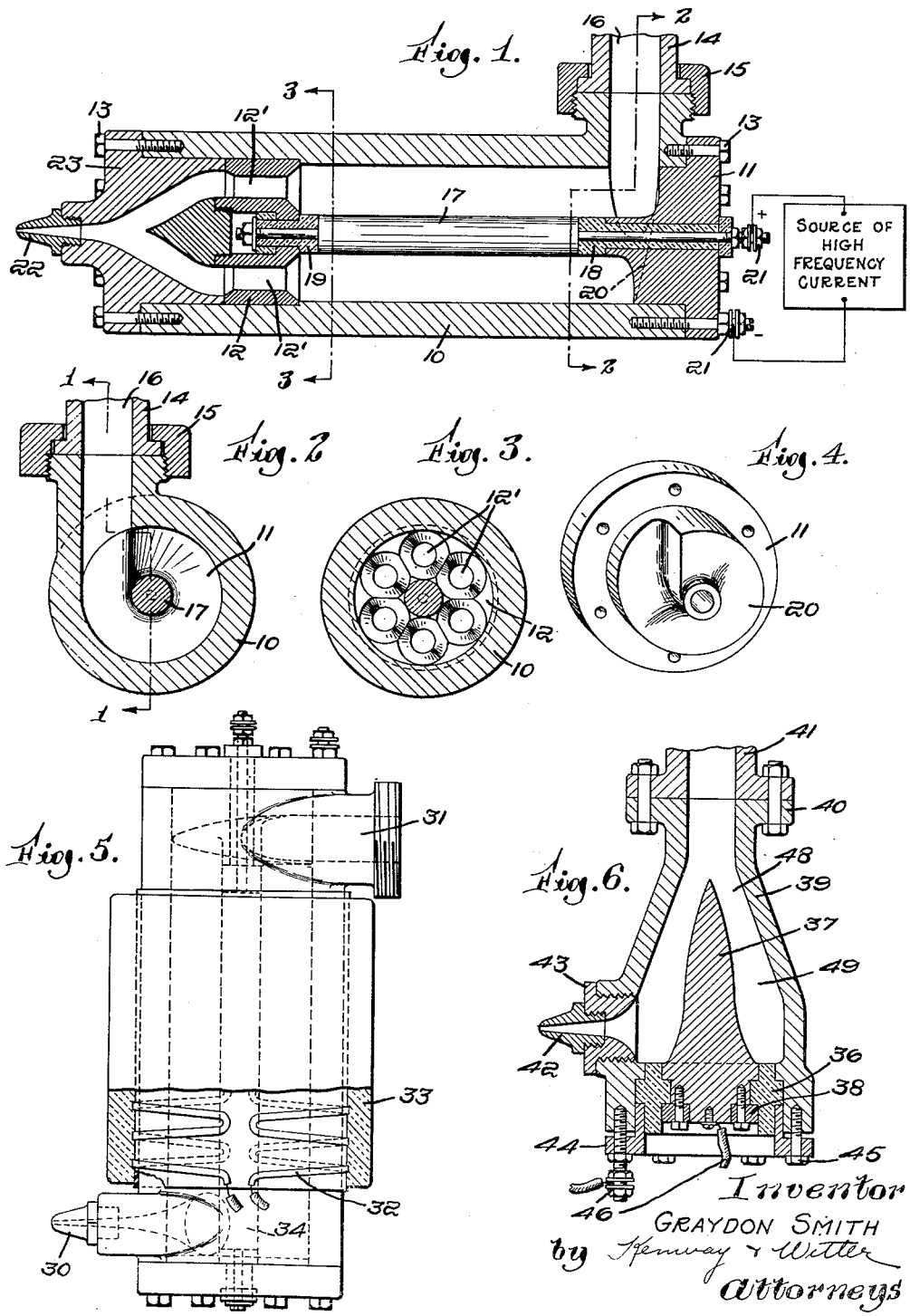
Inventor
GRAYDON SMITH
by Kenway & Witter
Attorneys Patented Mar. 6, 1945

2,370,883

UNITED STATES PATENT OFFICE 2,370,883

APPARATUS FOR HEATING MATERIALS FOR MOLDING

Graydon Smith, Concord, Mass., assignor to Reed-Prentice Corporation, Worcester, Mass., a corporation of Massachusetts Application July 29, 1942, Serial No. 452,750

9 Claims. (Cl. 219—47)

This invention relates to the heating of thermoplastic materials in preparation for molding by the injection molding process and consists in a novel apparatus by which thermoplastic materials can be uniformly heated and rendered workable.

Equipment for molding thermoplastic materials by the injection process usually includes a hopper or other receptacle for the raw material which is commonly in the form of granules, pellets or powder; a plunger or ram for forcing this material through the apparatus; a heater for applying heat to the material thus softening and rendering it sufficiently fluid; a nozzle for conveying the material to the die; and a die in which the material assumes the desired shape and becomes solid.

The process as outlined above is familiar to anyone skilled in the art of injection molding. It is well known that one of the most serious limitations of the process of injection molding lies in difficulty of heating the material properly, since the material must be sufficiently fluid or the moldings will be imperfect, yet, if overheated, the material becomes discolored or "burned." The heating must be rapid and uniform, because prolonged heating has an adverse effect. Furthermore, the thermoplastic materials commonly used are not adapted to rapid and uniform heating, as they are poor conductors of heat and exhibit a marked tendency to burn locally when in contact with a hot surface. The problem is further complicated by the fact that molding pressures of the order of 20,000 pounds per square inch are usual in commercial practice, and the actual stresses in the unit are apparently even higher than this figure would indicate. This appears to be due to the fact that thermoplastic material is jammed into the heater as a semi-solid mass, and although every effort is made to design the heater with streamlined passages to permit the mass to advance as freely as possible, yet excessively high local stresses appear wherever the advancing mass impinges on the surfaces of the heater. This careful streamlining is also necessary in order to maintain the required fluid pressure at the die without the necessity of applying excessive force back of the ram or plunger which advances the material.

In the usual form the heater comprises an elongated cylinder of robust proportions, a core or "pineapple" adapted to spread the advancing material in an annular layer on the inside surface of the cylinder so that it will present a large heating surface in comparison to its mass, and a source of heat such as an electric heating unit disposed over the outer surface of the cylinder. Such a device has not proved suitable for heating large masses of material, and the injection process has in consequence been limited to the production of small pieces such as combs, bottle caps, buttons and the like. Even with small charges the device leaves much to be desired since proper control of the heating is very difficult. An adequate conduction of heat through the thick cylinder wall is accompanied by an excessive temperature gradient, so that the temperature at the heating surface is erratic unless the skill and judgment of the operator are excellent.

An important object of this invention is to provide means for uniform and rapid heating of thermoplastic material under the conditions imposed by the injection process, by generating the necessary heat within the material itself by dielectric losses by exposing it to a radio-frequency electric field.

Important features of my invention reside in the fact that it can be used to heat large masses of thermoplastic material, requires the minimum of skill on the part of the operator, and is adapted to be automatically controlled.

The phenomenon that insulating materials are heated by exposure to a radio frequency field is familiar to all who have had occasion to work with high frequencies. For example, it is well known that when a slab of cellulose acetate, glass, rubber, etc., is placed between the plates of a condenser on which a radio-frequency voltage is impressed, the material will absorb energy from the electric circuit and be heated thereby. To be useful in heating of thermoplastic materials for injection molding, however, such a condenser must take the forms of an enclosed pressure vessel of sufficient structural strength to withstand high pressures and shocks, and furthermore must serve as a conduit adapted to permit the free flow of the material from inlet to outlet. The scope of this invention lies in reconciling the requirements for an electrical condenser of high efficiency with those of a heating device for the injection molding process.

A preferred apparatus may be comprised of an elongated conduit in the form of a hollow cylinder provided with a centrally disposed inner rod and ports for the entrance and discharge of thermoplastic material. The outer wall of the conduit and the inner rod serve as electrodes in a high frequency electric circuit, thermoplastic materials may be forced into the conduit and thus into the space between the electrodes where they absorb energy from the field surrounding the inner electrode. The result is that the thermoplastic materials become uniformly heated to high temperatures, since such materials possess high dielectric constants.

These and other features of the invention will be best understood and appreciated from the following description of a preferred embodiment thereof selected for purposes of illustration and shown in the accompanying drawing in which—

Fig. 1 is a view in cross section of one form of the complete heater along the line 1—1 of Fig. 2, Fig. 2 is a view in cross section along the line 2—2 of Fig. 1, Fig. 3 is a view in cross section along the line 3—3 of Fig. 1, Fig. 4 is a perspective drawing of the end plate employed in the heater shown in Figs. 1 and 2.

Fig. 5 is a view in side elevation of a modified heater showing a different position for the nozzle and an insulating jacket, and Fig. 6 is a view in cross section of another modified form of heater.

As shown in the drawing, the apparatus preferably comprises a cylindrical conduit closed at its ends by a plate 11 and an apertured plug 23 attached by stud bolts 13, the whole being of suitable proportions to stand the pressures inherent in the process. Cylinder 10 is attached to the body of the machine 14 by the screw collar 15, thus adapting it to receive cold material through the passage 16. As shown in Fig. 2 the passage 16 is located off the center line of the cylinder, and thus imparts a spiral motion to the material as it advances down the conduit 10. This spiral motion is further promoted by the spiral face 20 on the end plate 11, shown in perspective in Fig. 4. Axially disposed within the cylinder 10 is the metallic electrode 17, supported by insulators 18 and 19 which are of fused quartz, mica or other low-loss dielectric material. This central electrode 17 is adapted to act as one plate of an electric condenser, the other plate being provided by the conduit 10 and the end plates 11 and 12, all of which cooperate to impress a radio frequency field on the material when attached to a suitable source of energy. Terminals 21 are provided on the members 10 and 17 for attachment to a suitable source of radio frequency current. This energy source can be of any convenient form well known to the art, and is indicated diagrammatically in the drawing. The material to be heated absorbs energy from this radio frequency field and is heated as it advances down the conduit 10 and exits in fluid condition through a nozzle 22 threaded into the apertured plug 23 bolted to the end of the conduit 10. Very heavy pressure is required to force the cold material into the passage 16 and the spiral face 20 is designed to receive and sustain this force and conduct the material spirally around the core 17 without placing damaging lateral pressure thereagainst. When the material reaches the end plate 12 it is sufficiently softened to readily pass through the holes 12'.

As shown in Fig. 1 of the drawing and described herein the unit is best adapted to operate in a horizontal position and to receive material from a vertical ram located above the heater. It is to be understood, however, that the heater may be adapted to operate in any other position and that the scope of this invention includes other arrangements of the nozzle or nozzles and the ram as may prove expedient in particular applications. Specifically, Fig. 5 illustrates an arrangement better adapted for attachment to existing machines, and shows a nozzle 30 mounted parallel to the axis of an intake port 31. Fig. 5 also illustrates the use of a jacket 33 with heating means, such as a resistance element 32, adapted to supply external heat to the unit, to take care of losses due to radiation and conduction to the frame of the machine. Radio frequency energy is rather costly, and the use of the jacket 33 conserves it for the work for which it is particularly adapted. The jacket 33 supplies some heat to the material although this is not its primary purpose. It should be understood, however, that it is within the scope of the invention to compensate for such excess heat, for by choosing suitable dimensions for the central electrode 34 it is possible to concentrate the field around the central electrode 34, thus providing extra dielectric heating near the center of the mass of the material to balance any extra conductive heating from the outside and thus preserving an essentially uniform heating throughout the material.

In Fig. 6 is illustrated a modified form of my invention differing primarily in employing only one insulator 36 for the central electrode 37. The central electrode 37 is shown in the form of a cone, one end being pointed to spread the material and the other end enlarged to distribute the mechanical stresses over the enlarged annular insulating ring 36 to which it is clamped by the ring 38. The conduit or cylinder 39 is modified to cooperate with the cone-shaped electrode 37, and takes the form of a hollow cone. At the "neck" of the cone, the flange 40 provides for bolting the device to the frame 41 of the molding machine. An exit for the material is provided through the nozzle 42 and the adapter 43, the latter being used as a matter of convenience in machining. A flanged ring 44 together with bolts 45 are employed to support and clamp the insulator 36 within the body 39. The modified device is essentially similar in operation to those shown in Figs. 1–4 although the material advances through it as a spreading annular layer rather than in a spiral path. Terminals 46 are provided on the members 37 and 39 for attachment to a suitable source of radio frequency current.

One important feature of my invention—that the distribution of the heating can be controlled by the geometry of the internal surfaces—is well illustrated in Fig. 6. The two surfaces of the condenser are closer together at 48, where the material is cold, than at 49 where the material is plastic. Thus the entering material will be heated rapidly due to the more intense field, while material that has been heated will be in a weaker field where the heating effect is less. This serves two useful purposes. It compensates for the fact that dielectric materials in general, including those which this device is intended to heat, tend to absorb more energy when they are hot than when they are cold. It furthermore adapts the device to more rapid heating, since any local high temperatures in the material such as might be caused in an intense field by a lack of homogeneity are not likely to cause burning when the main body of the material is cold, so that an intense field can be safely applied. Conversely, when the mass of material is completely up to the desired temperature, even a slight additional increase in temperature might cause burning so that it is not advisable to apply an intense field.

It will be evident from the above that an important and novel feature of my invention lies in adapting one electrode of the condenser to act as a pressure vessel suited to receive the material and equipped with suitable inlet and outlet ports, and in locating the other condenser electrode within the first in such position that it does not obstruct the flow of moldable material through the vessel and provides for the heating of the material by a high frequency dielectric field between the electrodes as the material passes through the vessel.

Having thus described my invention, what I claim as new and desire to secure by Letters Patent of the United States, is:

1. Apparatus for dielectrically heating materials for molding by a high frequency field, comprising two members providing an electrical condenser, one member being of tubular construction and the other member being disposed longitudinally within and spaced from the first member, means providing molding material entrance and exit passages into and from the tubular member, the entrance passage being disposed laterally into the tubular member and to one side of the other member, and means providing a fixed surface in the tubular member cooperating with the entrance passage to receive and advance the molding material spirally around the inner member and toward the exit passage as it is forced into the entrance passage, the molding material being adapted to be heated by a high frequency dielectric field between said members as the material passes through the tubular member.

2. The apparatus defined in claim 1 in which the last named means includes a fixed spiral face within the tubular member and having its lowermost end portion in alignment with said entrance passage.

3. The apparatus defined in claim 1 in which the tubular member is closed at one end by a plug having a fixed spiral face on its inner end cooperating with the entrance passage to direct the molding material through the member, and a plug closing the other end of the tubular member and carrying a nozzle with an exit passage therethrough from the tubular member.

4. The apparatus defined in claim 1 in which the tubular member is closed at one end by a plug supporting one end of the inner member and having a fixed spiral face on its inner end cooperating with the entrance passage to direct the molding material through the member, and means within the tubular member supporting the other end of the inner member and having holes therethrough located about the inner member for passage of the molding material.

5. Apparatus defined in claim 1 in which the exit passage is disposed laterally of the tubular member in position to receive and conduct the molding material in the general direction of its spiral movement through the tubular member.

6. Apparatus for dielectrically heating materials for molding, comprising two members providing an electrical condenser, one member being of tubular construction and the other member being disposed longitudinally within and spaced from the first member, means providing molding material entrance and exit passages into and from the tubular member, the molding material being heated by the high frequency dielectric field between said members as the material passes through the tubular member, and a supplemental heater surrounding the tubular member and cooperating therewith to heat the outer portion of the tubular member and conserve the heat generated dielectrically in said field.

7. Apparatus for heating materials for molding, comprising a tubular pressure vessel of electro-conductive material, an electro-conductive member within and insulated from the vessel, means providing relatively spaced molding material entrance and exit passages into and from the vessel, said member extending longitudinally of the vessel and spaced from the inner wall thereof, means within the vessel providing a fixed surface for receiving the material from the entrance passage and directing the same in a circuitous path around and along said member, and means electro-conductively connected to the vessel and member and forming the circuit terminals for a high frequency electric current, the vessel and member forming an electric condenser within which molding material forced through the vessel is adapted to be heated by dielectric absorption of energy from the dielectric field between the member and the vessel.

8. Apparatus for heating materials for molding, comprising a tubular electro-conductive member, an electro-conductive member disposed longitudinally within and spaced from the inner wall of the tubular member along a substantial length thereof, the first member forming a conduit for the passage of molding material longitudinally therethrough between the inner member and the inner wall of the outer member, means providing a molding material entrance passage extending laterally into one end of the conduit in lateral alignment with the inner wall thereof and to one side of the inner member whereby solid molding material forced into the passage impinges directly against the inner wall of the conduit and with equal pressure against opposite sides of the inner member, means providing an exit passage from the other end of the conduit, the inner and outer members being insulated from each other, and means electro-conductively connected to the inner and outer members and forming the circuit terminals for a high frequency current adapted to heat the molding material dielectrically as it passes through said substantial length portion of the conduit.

9. Apparatus for heating materials for molding, comprising a tubular electro-conductive member having a chamber therein embodying a cylindrical passage widening out into a conical passage, a conical electro-conductive member within the conical passage, the conical member being supported at its base on and insulated from the tubular member and having its smaller end located adjacent to the junction of the cylindrical and conical passages and its outer surface spaced from the inner wall of the tubular member to form an annular passage therearound, means providing a nozzle exit from the chamber remote from the cylindrical passage, and means electro-conductively connected to the inner and outer members and forming the circuit terminals for a high frequency current adapted to heat molding material dielectrically as it passes through the chamber, the distance between the inner and outer members in the annular passage increasing from a point adjacent to the smaller end of the conical member toward the larger end thereof.

GRAYDON SMITH.